United States Patent [19]
Jordan

[11] 3,760,780
[45] Sept. 25, 1973

[54] ELECTRIC HEATING MEANS FOR FUEL VAPORIZATION IN INTERNAL COMBUSTION ENGINES

[76] Inventor: Wilmer C. Jordan, 3915 W. Wrightwood Ave., Chicago, Ill. 60647

[22] Filed: Aug. 12, 1971

[21] Appl. No.: 171,110

[52] U.S. Cl. ...... 123/122 F, 123/122 H, 123/179 H
[51] Int. Cl. ............................................ F02m 31/12
[58] Field of Search .................... 123/122 F, 122 H, 123/179 H, 133

[56] References Cited
UNITED STATES PATENTS
| | | | |
|---|---|---|---|
| 1,344,242 | 6/1920 | Newell, Jr. | 123/122 F |
| 1,631,176 | 6/1927 | Wirrer | 123/122 F UX |
| 2,175,738 | 10/1939 | Betry | 123/122 F X |

*Primary Examiner*—Al Lawrence Smith
*Attorney*—Harry C. Alberts et al.

[57] ABSTRACT

Electric heating means for fuel vaporization in internal combustion engines to improve the efficiency, performance and starting thereof, an optimum amount of electrical power being supplied to the heating means during operation of the engine. Important features relate to the mounting of the electric heating means in a support plate between a carburetor and an intake manifold and in the construction and mounting of the heating means to achieve maximum efficiency of radiation of heat into the air-fuel mixture. Another feature relates to the use of a heating unit for each engine cylinder, mounted adjacent the intake valve. Further features relate to the construction of the heating means for improving the starting of small engines having a cubic inch displacement of on the order of thirty cubic inches or less.

2 Claims, 11 Drawing Figures

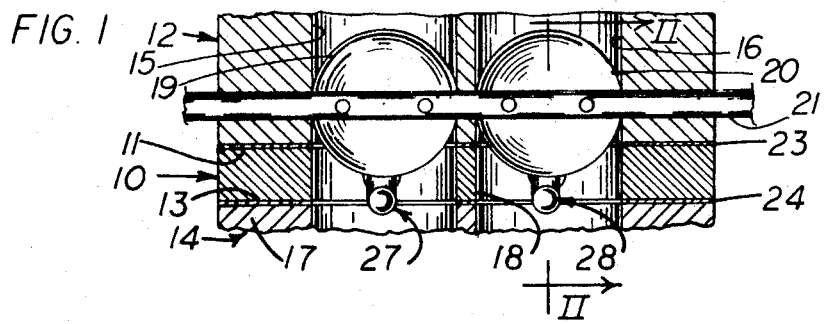
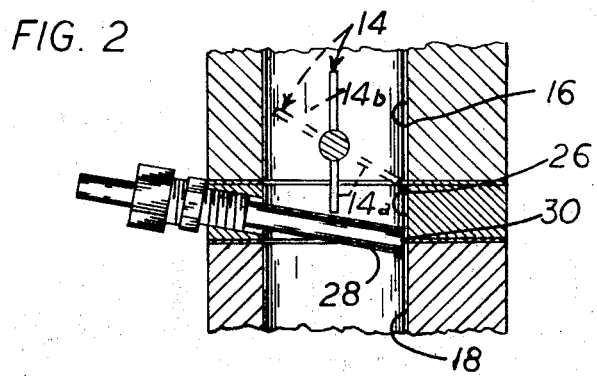
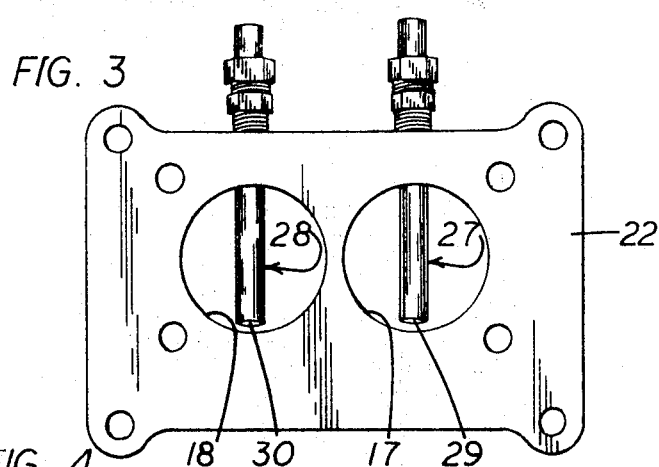
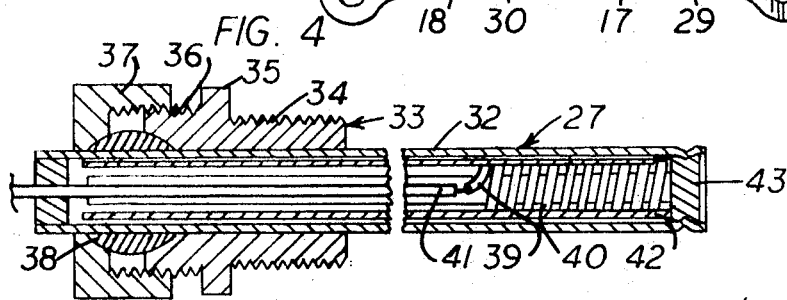

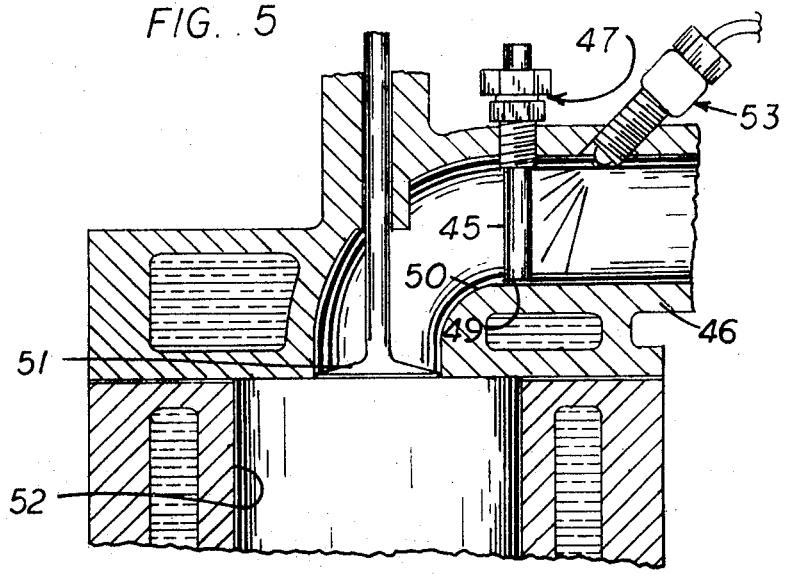
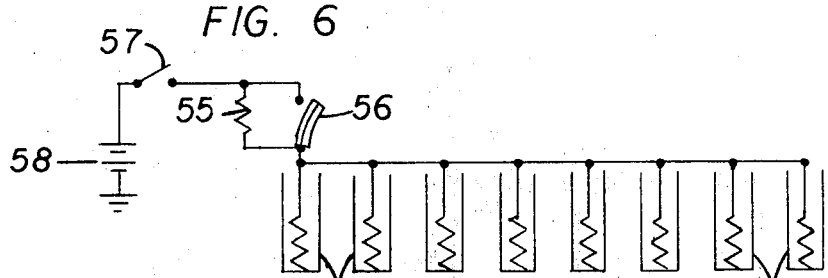
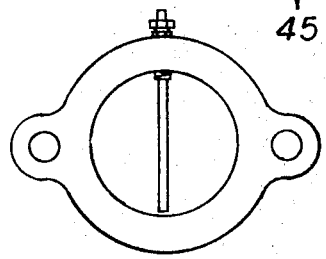
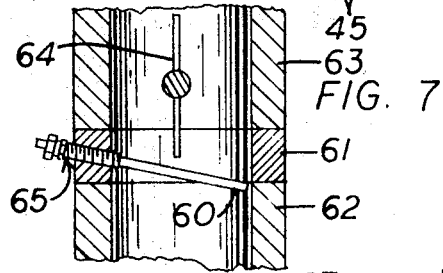
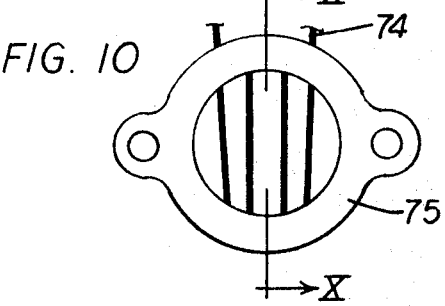
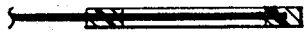
INVENTOR
WILMER C. JORDAN
BY Alberts, Brezina & Lund
ATTORNEYS

ELECTRIC HEATING MEANS FOR FUEL VAPORIZATION IN INTERNAL COMBUSTION ENGINES

This invention relates to electric heating means for fuel vaporization in internal combustion engines and more particularly to improvements upon the electric heating means disclosed and claimed in my U.S. Pat. No. 3,556,065, issued Jan. 19, 1971.

As disclosed in my patent, a very substantial increase in the efficiency and performance of internal combustion engines can be obtained by installing electric heating means to radiate heat into an air-fuel mixture, with the amount of electrical power supplied to the heater means being effective to cause radiation of an optimum amount of heat into the mixture.

The arrangements disclosed in my patent are highly satisfactory, but problems have been encountered with respect to installation, especially when performed by unskilled persons, and the invention was evolved, in part, with the object of overcoming such problems.

The invention also involves improvements and discoveries, conceived and made during further developmental work, directed at refinements in the invention of my aforesaid patent.

Important features relate to the mounting of the electric heating means in a support plate between a carburetor and an intake manifold and in the construction and mounting of the heating means to achieve maximum efficiency of radiation of heat into the air-fuel mixture. One feature relates to the provision of a spacing between a terminal end of a heating element and adjacent internal surface portion of a through passage of the support plate. Another feature relates to the placement of resistance means only in a terminal end portion of the unit and in the placement of the unit with respect to the throttle valve. A further feature relates to the angulation of the electric heating unit to permit use of a relatively thin support plate while also optimizing the radiation of heat into the fuel.

Still another important feature of the invention relates to the use of a heating unit for each engine cylinder mounted closely adjacent the intake valve. This arrangement is highly advantageous in engines having conventional carburetors and is also particularly advantageous in engines utilizing fuel injection.

Additional features relate to the construction of the heating means for improving the starting of small engines while also improving the efficiency and performance thereof.

This invention contemplates other objects, features and advantages which will become more fully apparent from the following detailed description taken in conjunction with the accompanying drawings which illustrate preferred embodiments and in which:

FIG. 1 is a cross-sectional view showing a device constructed in accordance with the invention, installed between a carburetor and an intake manifold;

FIG. 2 is a sectional view taken substantially along line II—II of FIG. 1;

FIG. 3 is a bottom plan view of the device of FIGS. 1 and 2;

FIG. 4 is a sectional view, on an enlarged scale, showing the construction and mounting, of the heating element of the device of FIGS. 1-3;

FIG. 5 is a sectional view showing the mounting of an electric heating unit adjacent one intake valve of an internal combustion engine;

FIG. 6 is a schematic electrical diagram showing a circuit for energizing heating units according to FIG. 5;

FIG. 7 is a cross-sectional view showing another form of device according to the invention, and especially designed for small engines;

FIG. 8 is a bottom plan view of the device of FIG. 7;

FIG. 9 is a cross-sectional view, on an enlarged scale, of a heating element of the device of FIGS. 7 and 8;

FIG. 10 is a top plan view of another form of device according to the invention, especially designed for small engines; and FIG. 11 is a cross-sectional view taken substantially along line X—X of FIG. 10.

Reference numeral 10 generally designates a device constructed according to the principles of the invention and designed for installation between a mounting surface 11 of a carburetor 12 and a surface 13 of an intake manifold 14 of an internal combustion engine. The illustrated carburetor is a two-barrel carburetor having two parallel fuel passages 15 and 16, aligned with passages 17 and 18 of the intake manifold 14, with a pair of butterfly throttle valves 19 and 20 being supported in the passages 15 and 16 by means of a common shaft 21. The valves 19 and 20 are shown in fully open positions in full lines in FIGS. 1 and 2, the "closed" position of valve 16 being shown in broken lines in FIG. 2.

The device 10 comprises a mounting plate 22 clamped between the carburetor mounting surface 11 and the manifold surface 13, preferably with gaskets 23 and 24 engaged between surfaces 11 and 13 and the opposite planar surfaces of the plate 22. Plate 22 has through passages 25 and 26 for flow of the mixed air and fuel from the carburetor passages 15 and 16 into the manifold passages 17 and 18. It is here noted that the passages 17 and 18 need not be separate but may be a single passage.

A pair of electric heating elements 27 and 28 are mounted in transverse internally threaded openings in the plate 22 to extend into the through passages 25 and 26, for radiation of an optimum amount of heat into the air-fuel mixture and to improve performance and efficiency while also improving starting. In accordance with an important feature, the elements 27 and 28 have terminal ends 29 and 30 spaced a short distance from the adjacent internal surface portions of the through passages 25 and 26. The elements 27 and 28 thus extend nearly all the way across the through passages, but since there is no direct contact, conduction of heat from the elements to the plate 22 is minimized and a maximum amount of heat is radiated into the air-fuel mixture.

FIG. 4 shows the construction and mounting of the heating element 27, it being understood that the construction of the other element 28 is the same. The element 27 comprises an outer metallic tube 32, which may preferably be of stainless steel, which is slidably mounted in a sleeve 33 having a first externally threaded portion 34, adapted to be threaded into the internally threaded transverse opening of the plate 22, and intermediate flange portion 35, preferably of hexagonal shape, and a second externally threaded portion 36, which receives an internally threaded nut 37 which is arranged to engage and compress a split clamping ring 38 into tight frictional engagement with the outer surface of the tube 32. This arrangement permits removal of the element 27 if replacement is required, and also permits adjustment of the position of the element to obtain a close spacing between the terminal end 30 and the adjacent surface portion of the plate 22.

The element 27 comprises a cylindrical rod 39 of a ceramic or other insulating material on which a resistance wire 40 is wound, one end of the wire 40 being welded or otherwise electrically connected to the tube 32 adjacent the end thereof and the other end of the wire 40 being connected to a wire 41, for connection to the battery of the vehicle, or to any desired source of electrical power. A sleeve 42 of woven glass or other insulating material surrounds the rod 39, the resistance wire 40 and the portion of the wire 41 within the tube 32. A plug 43, preferably of metal, is tightly held in the end of the tube 32 as by a crimping the tube 32 into engagement therewith, preferably with a sealed connection.

An important feature is that the resistance wire 40 is only a terminal end portion of the element 27, which minimizes the conduction of heat to the plate 22 and also permits application of the radiant heat into a part of the air-fuel flow path, such as to obtain optimum results. As shown in FIG. 2, the element is so positioned that the terminal end portion thereof is positioned below a portion 14a of the throttle plate 14, portion 14a being the portion which extends downwardly when the throttle valve is open, the other portion 14b being projected upwardly when the throttle valve is open. It will be observed that when the throttle valve is slightly open, the major portion of the flowing air-fuel mixture impinges directly against the terminal end portion of the element when it is positioned as illustrated.

Another feature of the invention is in the disposition of the unit at a slight angle such that the throttle valve 14 can fully open, while still minimizing the required thickness of the mounting plate 22. This feature is, of course, particularly desirable in vehicles in which the throttle valve when fully open, extends below the level of the mounting surface thereof.

FIG. 5 illustrates another arrangement according to the invention in which a heating element 45 is mounted in the intake manifold 46 of an engine by support means 47 similar to the support means illustrated in FIG. 4. Element 45 preferably is a construction similar to that of the element 27 as illustrated in FIG. 4, with the resistance wire being in a terminal end portion of the element. A terminal end 49 of the element 45 is preferably positioned in spaced relation to an adjacent portion of a flow passage 50, to prevent direct conduction of heat to the wall of the intake manifold.

The element 45 is positioned in the intake manifold 46 adjacent an intake valve 51, operative to admit the fuel-air mixture into a cylinder 52 for combustion therein, and in the case of a multiple cylinder engine, an individual heating element is similarly mounted with respect to the intake valve for each cylinder.

In the illustrated arrangement, a fuel injector 53 is provided for injecting a controlled amount of fuel into the passage 50 at an appropriate time during each cycle of operation of the engine, and the heating element 45 is positioned between the fuel injector 53 and the intake valve 51. Preferably, the heating element 45 is positioned as shown with the terminal end portion being generally aligned with the fuel injector 53, so that fuel injected by the injector 53 is immediately exposed to the radiant heat from the element 45 to be vaporized.

Although illustrated in combination with the fuel injector 53, the arrangement can be used with an engine having the more conventional type of throttle valve means in which fuel is supplied into a carburetor. In either case, the amount of electrical power supplied to the heating element should be within the range as disclosed in my U.S. Pat. No. 3,556,065.

FIG. 6 shows a circuit for energizing the elements 45 which are in parallel and through a resistor 55, shunted by a bimetal switch 56 and through a switch 57, which may be the accessory switch, to the ungrounded terminal of the battery 58. The bimetal switch 56 is exposed to ambient air and may, for example, be located in front of the radiator in a conventional automobile. It is arranged to close when the ambient temperature drops below a predetermined temperature and to open when the ambient temperature rises above that predetermined temperature. Tests performed thus far indicate that the arrangement of FIG. 5, with an individual heating element for each cylinder, is more sensitive to changes in ambient temperature and that the automatic adjustment provided by the circuit is desirable. The switch 56 may, for example, be arranged to close when the ambient temperature drops below approximately 35 degrees and the value of the resistor 55 may be such in relation to the values of the resistance elements of the heating elements 45 as to increase the power by ten per cent when the switch 56 is closed.

It is noted that additional bimetal or other temperature responsive elements may be employed to obtain more refined adjustment of power in accordance with changes in ambient temperature and a similar type of circuit may be employed in conjunction with heating elements mounted in or in close proximity to a conventional carburetor. In all cases, regardless of where the heating means is located in the air-fuel flow path, the amount of electrical power supplied within each range of ambient temperature should be within the optimum range for obtaining maximum performance, according to my aforesaid patent.

FIGS. 7 and 8 illustrate another form of device according to the invention, especially designed for small engines, having a cubic inch displacement of on the order of 50 cubic inches or less. In this arrangement, a heating element 60 is supported by a support plate 61, mounted between an intake manifold 62 of an engine and a carburetor 63 having a throttle valve 64. The heating element 60 is preferably mounted at an angle, in a manner similar to the angular mounting of the elements 27 and 28, to obtain similar advantages, and a mounting device 63 may be provided, similar to the mounting device, illustrated in FIG. 4.

Contrary to what might be expected, it is desirable that the heating element in a small engine should have a cross-sectional size which is greatly reduced in comparison to the cross-sectional size of the flow passage. An explanation of this feature requires consideration of the requirements for optimum starting, which is a very important consideration in connection with small engines, generally very difficult to start. It has been found that for optimum starting, the surface temperature of the heating element should reach a stabilized temperature of on the order of 400 degrees F. (in the range of from 300 degrees F. to 500 degrees F.) when the engine is cold and before being turned over for starting. The surface temperature is primarily determined by the amount of electrical power supplied to the resistance element, the heat conductivity from the resistance element to the walls defining the flow path and the surface area of the heat radiating surface of the heating element. The heat conductivity can generally be held to a low value and the surface area becomes a primary factor. If the surface area is too large, the surface temperature will not reach a high enough value, even though the electrical power is sufficient to obtain optimum performance according to my aforesaid patent. Thus, it is found that the surface area should be reduced to a comparatively low value which, in turn, requires an element of small cross-sectional dimensions. By way of example, for an engine having a cubic inch displacement of 10, the electrical power supplied in accordance with my aforesaid patent should be in the neighborhood of 2.5 watts and in order to obtain a stabilized surface temperature of 400 degrees F., the surface area of the radiating surface of the element should be on the order of 0.06 square inches. Thus, if the heat radiating portion of the element is cylindrical with a length of about 0.5 inches, the diameter should be on the order of 0.04 inches.

FIG. 9 is a cross-sectional view of the element 60 which comprises an outer metal casing 67, a short length of resistance wire 68 connected at one end to a terminal end wall 69 of the casing and at its other end to a connection wire 70, the resistance wire 68 being surrounded by an insulating sleeve 71 and the connection wire 70 being surrounded by insulation 72. It is noted that the resistance wire is located only within the terminal end portion of the element, which is highly desirable for reasons pointed out previously in connection with the arrangement of FIGS. 1–4.

FIGS. 10 and 11 illustrate another construction in which a resistance wire 74 is held in a support member 75, of insulating material and preferably of a gasket material, the member being arranged for insulating between the intake manifold and the carburetor. Preferably, the element 74 is so formed that a number of portions thereof, four as illustrated, extend across the flow path. With this arrangement, the surface area of the element is quite small and the required temperature for optimum starting can be readily obtained. The arrangement does, however, have the disadvantage that the resistance element is directly exposed.

It is noted that in small engines, the resistance heating element can be located closely adjacent the intake valve, with an arrangement as illustrated in FIG. 5, for example, but with, of course, appropriate changes in the surface area in other dimensions of the element.

It will be understood that modifications and variations may be effected without departing from the spirit and scope of the novel concepts of this invention.

I claim as my invention:

1. In apparatus for improving the performance of an internal combustion engine having an intake manifold and having a carburetor including a housing having a flow passage, a generally planar outer mounting surface generally transverse to the axis of said passage and a throttle plate in said passage pivotally mounted on an axis intermediate said flow passage axis and generally parallel to said mounting surface for movement between a closed position and an open position in which one side of said plate projects outwardly, a heating element support plate adapted for mounting between said outer mounting surface of said carburetor and said monifold and having a through passage for flow of mixed air and fuel from said carburetor passage into said intake manifold, said plate having a transverse opening between the opposite surfaces thereof and between said through passage and an outer side surface portion of said plate, and an elongated electric heating unit supported by said plate to extend in said transverse opening, said electric heating unit extending from one internal side surface portion of said through passage to a terminal end spaced a short distance from an opposite internal side surface portion of said through passage, said transverse opening having an axis in a plane through the axis of said through passage and generally trnasverse to a plane defined by said throttle plate and carburetor passage, and said terminal end being positioned opposite said one side of said throttle plate in the closed position thereof, said transverse opening axis being at an angle to the planes of the opposite surfaces of said plate to position said terminal end away from said throttle plate.

2. In apparatus for improving the performance of an internal combustion engine having an intake manifold and having a carburetor including a housing having a flow passage, a generally planar outer mounting surface generally transverse to the axis of said passage and a throttle plate in said passage pivotally mounted on an axis intermediate said flow passage axis and generally parallel to said mounting surface for movement between a closed position and an open position in which one side of said plate projects outwardly, a heating element support plate adapted for mounting between said outer mounting surface of said carburetor and said manifold and having a through passage for flow of mixed air and fuel from said carburetor passage into said intake manifold, said plate having a transverse opening between the opposite surfaces thereof and between said through passages and an outer side surface portion of said plate, and an elongated electric heating unit supported by said plate to extend into said transverse opening, said electric heating unit extending from one internal side surface portion of said through passage to a terminal end spaced a short distance from an opposite internal side surface portion of said through passage, said heating unit including an outer metallic housing, and an electric resistance element positioned within only a terminal end portion of said unit, said transverse opening having an axis in a plane through the axis of said through passage and generally transverse to a plane defined by said throttle plate and carburetor passage axes, and said terminal end being positioned opposite said one side of said throttle plate in the closed position thereof.

* * * * *